Feb. 16, 1971 P. B. MAUER 3,563,633
PHASE-COMPENSATED TRIHEDRAL REFLECTORS
FOR INTERFEROMETER SYSTEMS
Filed June 27, 1968

PAUL B. MAUER
INVENTOR.

BY William F. Delaney Jr.
Robert W. Hampton
ATTORNEYS

United States Patent Office 3,563,633
Patented Feb. 16, 1971

3,563,633
PHASE-COMPENSATED TRIHEDRAL REFLECTORS FOR INTERFEROMETER SYSTEMS
Paul B. Mauer, Rochester, N.Y., assignor to Eastman Kodak Company, Rochester, N.Y., a corporation of New Jersey
Filed June 27, 1968, Ser. No. 740,741
Int. Cl. G02b 27/28
U.S. Cl. 350—157       5 Claims

ABSTRACT OF THE DISCLOSURE

A trihedral reflector is disclosed having means for reflecting plane-polarized light with the same polarization state as the incident light. Such a reflector is particularly useful in an interferometer system employing a laser light source. A trihedral reflector with phase-compensating coatings on the reflective surfaces is combined with a quarter-wave plate which converts incident plane-polarized light into circularly-polarized light and reconverts reflected circularly-polarized light back into plane-polarized light, so that the final polarization state is the same as that of the incident light. Additional thin film coatings are provided to advance or retard the longitudinal phase of light incident in any one sextant with respect to light incident in adjacent sextants to compensate for a relative phase retardation or advancement which is effected according to the sextant in which the light is incident.

BACKGROUND OF THE INVENTION

The present invention relates to improved trihedral reflectors and, more particularly, to such reflectors particularly adapted to reflect plane-polarized light in the same state of polarization as the incident light.

Trihedral reflectors may be defined as comprising three mutually perpendicular reflecting surfaces. These reflecting surfaces may be three independent mirror surfaces mounted mutually perpendicularly, or preferably they may be three internally reflecting surfaces of a cube corner prism. A light ray striking these three mutually perpendicular plane reflecting surfaces in succession will return in a path which is parallel to its original direction in a manner substantially independent of the orientation of the trihedral reflector with respect to the incident light ray. Because of these properties, the trihedral reflector is often used in practical applications where it is important to provide for the reflection of light rays in a path parallel to the incident ray, such as for example in interferometric optical systems.

Present-day interferometers which are adapted for long range measurements often employ a laser light source because laser radiation is highly monochromatic and directional and transmits high intensity light beams over long distances with a minimal loss of energy due to divergence. However, trihedral reflectors cause the phase of the components of reflected polarized light to shift with respect to the phase of the incident light, thereby changing the state of polarization, for example to elliptical polarization. This distortion of the polarization state prevents the reflected beam from interfering effectively with the incident beam.

An article in the Journal of the Optical Society of America, Vol. 56, No. 9, pages 1219–1221, September 1966 entitled "Phase-Compensation of Total Internal Reflection" by Paul B. Mauer describes thin film combinations which may be provided on the reflecting surfaces of a cube corner prism to compensate for the phase shift between the components of reflected polarized light with respect to the phase of the components of incident polarized light. However, as stated in that article, cube corner reflectors having such phase-compensating coatings in general rotate the plane of polarization of the reflected plane-polarized light with respect to that of the incident light.

SUMMARY OF THE INVENTION

It is an object of this invention to provide a trihedral reflector with means for returning reflected light in the same state of polarization as the incident plane-polarized light and with uniform phase over the aperture.

According to this invention a quarter-wave plate is provided in front of a trihedral reflector with phase-compensating coatings to convert incident plane-polarized light into circularly-polarized light and to reconvert the reflected circularly-polarized light into plane-polarized light, so that the final polarization state is the same as that of the incident light. Additional thin film coatings may be provided to advance or retard the longitudinal phase of light reflected in any sextant relative to the phase of light reflected from adjacent sextants to compensate for a phase retardation or advancement of light incident in one sextant with respect to the phase of light incident in adjacent sextants.

DETAILED DESCRIPTION OF THE DRAWINGS

Figure 1:
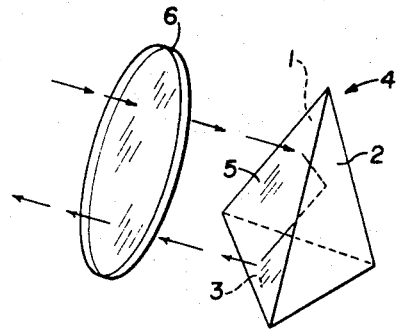
FIG. 1 is a perspective view of a cube corner prism and a quarter-wave plate with an incident and reflected light ray.
Figure 3:
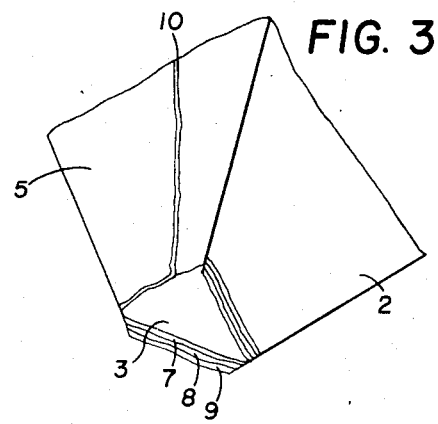
FIG. 3 is a perspective view partially in section of the prism in FIG. 1 showing thin film coatings according to this invention.
Figure 4:
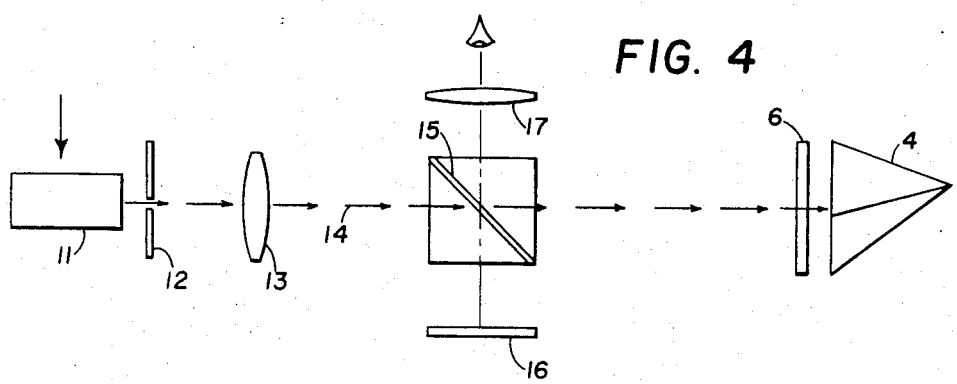
FIG. 4 schematically illustrates an optical interferometer incorporating a trihedral reflector according to the invention.

In FIG. 1 a trihedral reflector is shown in which the three reflective surfaces 1, 2 and 3 are mutually perpendicular surfaces of a prism 4 which has a light transmitting surface 5. A light ray incident upon the reflective surface 1 is reflected to a second reflective surface 2 and again to a third reflective surface 3, from which it is returned in a direction parallel to its original direction. The relative orientation of the prism with respect to the incident light ray is immaterial, except that the light ray must enter the prism through the transmitting surface 5. The reflecting surfaces of the prism are provided with thin film coatings, as seen in FIG. 3 and as described in the above referenced article in the September 1966 issue of The Journal of the Optical Society of America, to prevent a phase shift between the polarization components of reflected light with respect to the relative phase of the incident light.

In front of the light transmitting face 5 of the cube corner prism 4 is located a quarter-wave plate 6 which converts incident plane-polarized light into circularly-polarized light, and reconverts the reflected circularly-polarized light into plane-polarized light, so that the final polarization state is the same as that of the incident light. The quarter-wave plate is a crystal which produces a ¼ wavelength path difference between its ordinary and extraordinary ray, with its optic axis normal to incident light and forming an angle of 45° with the plane of vibration of the incident plane-polarized light. It is noted that the optic axis is a direction, and not a line. The incident beam can be considered to have two components, one vibrating parallel to the optic axis of the crystal and the other vibrating perpendicular to the optic axis. Since the beam is normal to the optic axis, both the parallel and perpendicular components traverse the same path through the crystals but at different velocities. The light emerging from the crystal therefore consists of two beams with vibrations which are parallel and perpendicular to the optic axis. The amplitudes of these component vibrations depend on the angle between the incident plane of vibration and the optic axis, and the phase difference depends upon the thickness of the crystal. To produce circularly-polarized light, the phase difference must be equivalent to a path difference of ¼ wavelength between the component vibrations, and the angle between the plane of vibration of the incident light and the optic axis must be 45°. Such a crystal is known as a quater-wave plate. In addition to converting plane-polarized light to circularly-polarized light when the incident vibration is at an angle of 45° with respect to the optic axis, such a plate will also convert circularly-polarized light into plane-polarized light.

Figure 2:
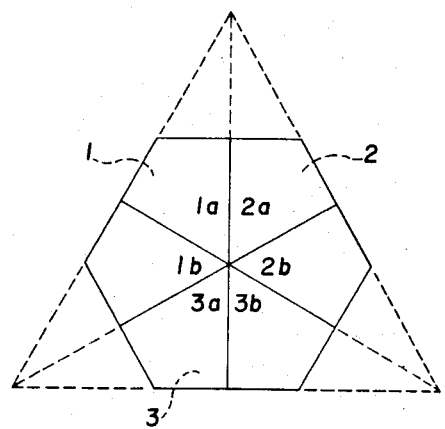
FIG. 2 is an illustration of the effective area of the light-transmitting face of a cube corner prism, which is helpful in describing the present invention.

FIG. 2 illustrates a view of the cube corner prism 4 looking through the transmitting face 5 onto the three mutually perpendicular reflected surfaces 1, 2 and 3, such that the cube gives the appearance of an equilateral triangle. Incident light rays passing through the face of the cube corner prism will strike each of the reflective surfaces in succession and then be reflected out parallel to the incident rays. An exception exists when the light rays pass through the face at very large variations from the perpendicular or to near one of the corners of the face, since they will impinge upon the light-transmitting face 5 after they have been reflected from either the first or second reflective surface and prior to striking the remaining reflective surfaces or surface. For these reasons the effective area of the prism face is approximately hexagonal, as seen in FIG. 2. It also appears as if the intersection between the adjacent reflective surfaces is extended to bisect the respective opposite reflective surfaces. These extensions are optical images of the lines of intersection of the reflective surfaces. Thus, the hexagon appears to be divided to six reflective apertures 1a, 1b, 2a, 2b, 3a and 3b. Light incident in any of the apertures will be returned from the diametrically opposite aperture in a direction substantially parallel to the incident light.

As explained above, incident plane-polarized light transmitted through the quarter-wave plate is reflected in a circularly-polarized state from each of the reflective surfaces of the prism. Although the circularly-polarized state of the light is maintained, these reflections of the circularly-polarized light in the cube corner prism may result in a longitudinal phase advancement or retardation of 120° with respect to the phase of incident light, depending on the sextant in which the light is incident. For example, if light incident on the cube corner prism in FIG. 2 is circularly polarized, and it is assumed that the light incident on sextants 1b and 2b will be returned from the diametrically opposite sextant with no phase shift, light incident in the other four sextants will be returned from the respective diametrically opposite sextants with a relative longitudinal phase shift of 120°. Reference is made to letter in the July 1967 issue of the Journal of the Optical Society of America, Vol. 57, No. 7, pp. 668–669 entitled "Modification of Phase-Compensated Corner Cube for Interferometry" by Paul B. Mauer. That is, if the light transmitted through sextants 1a and 3b is advanced by 120°, the light incident in sextants 2a and 3b will be retarded by 120°, or vice versa depending on whether the incident light is right or left-handed circularly polarized. To compensate for this relative longitudinal phase shift, thin film coatings can be provided to retard the longitudinal phase of light transmitted through selected sextants. For example, a coating could be included on a portion of the quarter-wave plate or the transmitting face 5 of the prism corresponding to sextant 1a which would retard by 120° the phase of light transmitted through the coating. A similar coating of double thickness would be provided for sextant 2a or 3a to retard 240° (equivalent to a 120° advance) and no coatings would be provided for sextants 1b and 2b. The prism with such coatings is corrected for either right-handed or left-handed circular polarization depending on the rotation direction of increasing phase correction. If thinner layers are desired, coatings could be provided on two diametrically opposed sextants to shift the phase by 60°, and two other diametrically opposed sextants could be provided with coatings which shift the phase of light by 120°, leaving the remaining two sextants uncoated. Any combination of thicknesses on diametrically opposed faces which totals the required phase correction is suitable.

The cube corner prism 4 in FIG. 1 is shown in FIG. 3 partially in section to show the surface coatings. All reflective surfaces of the prism have triple layer coatings 7, 8 and 9 as shown on surfaces 2 and 3 in the drawing. Examples of such coatings are given in the referenced article in the September 1966 issue of The Journal of the Optical Society of America. As explained more fully in that article, these coatings compensate for phase shift between the polarization components of reflected radiation with relation to the phase of incident radiation. These coatings prevent a change in the state of polarization of reflected light, so that incident circularly-polarized light remains circularly polarized. Single layer coatings 10 are provided on selected portions of the light transmitting face 5 of the prism 4. The thickness T of the coatings 10, which will retard the phase of transmitted light by 120°, may be determined from the formula:

$$T = \frac{1}{3} \frac{\lambda}{n-1}$$

where $n$ is the index of refraction of the film and $\lambda$ is the wavelength of transmitted light. It should be understood that the coating 10 can be located elsewhere in the system, such as on the quarter-wave plate. An example of a coating 10 is a layer of $MgF_2$ which has an index of refraction of 1.38 with a physical thickness of approximately 555 nanometers to provide a phase shift of 120° for light having a wavelength of 633 nanometers.

The optical interferometer schematically illustrated in FIG. 3 comprises a plane-polarized light source 11, such as for example a laser, which transmits light through a slit or pinhole 12 and a collimator lens 13 to form a light beam with rays parallel to an optical axis 14. The plane of polarization of the light source would preferably be parallel or perpendicular to the plane of incident on a beam splitter 15 to prevent the beam splitter from disturbing the state of polarization. This light beam is then passed through the beam splitter 15, which could be for example a thin coating of a dielectric material with a high index of refraction such as $TiO_2$ which transmits a portion of the light to the quarter-wave plate 6 and the cube corner prism 4, reflects the remaining portion of the light to a reflector 16 which may be a flat reflector or a trihedral reflector. If a trihedral reflector is used, it too should be phase compensated according to this invention. Both portions of the light leaving the beam splitter are returned to the beam splitter along substantially the same path used by the respective incident beams and are recombined at the beam splitter which directs the portion of the recombined light through a lens 17 which collects the interfering light.

The invention has been described in detail with particular reference to preferred embodiments thereof, but it will be understood that variations and modifications can be effected within the spirit and scope of the invention as described hereinabove and as defined in the appended claims.

I claim:
1. The combination for returning plane-polarized light along a path parallel to and in the same polarization state as the incident light comprising:
    a trihedral reflector having coatings on the reflective surfaces for compensating for a phase shift of the components of the reflected light with respect to the relative phase of the components of the incident plane-polarized light; and a quarter-wave plate positioned in front of the trihedral reflector in an orientation substantially perpendicular to the incident light for converting incident plane-polarized light into circularly-polarized light and for reconverting reflected circularly-polarized light back into plane-polarized light.

2. The combination claimed in claim 1, wherein said trihedral reflector comprises a cube corner prism with three mutually perpendicular reflecting surfaces and a light-transmitting surface.

3. The combination claimed in claim 1, further comprising means for compensating for a longitudinal phase shift of the circularly-polarized reflected light with respect to circularly-polarized light incident on the trihedral reflector from the quarter-wave plate.

4. The combination claimed in claim 2 further comprising phase retarding coatings on selected portions of the light-transmitting surface of the prism for compensating for a longitudinal phase shift of the circularly-polarized reflected light with respect to circularly-polarized light incident on the prism from the quarter-wave plate.

5. The combination for returning plane-polarized light along a path parallel to and in the same polarization state as the incident light comprising:
- a trihedral reflector having coatings on the reflective surfaces compensating for a phase shift of the components of the reflected light with respect to the relative phase of the components of the incident plane-polarized light;
- a quarter-wave plate positioned in front of the trihedral reflector in an orientation substantially perpendicular to the incident light for converting incident plane-polarized light into circularly-polarized light and for reconverting reflected circularly-polarized light back into plane-polarized light; and
- phase retarding coatings on selected portions of the quarter-wave plate for compensating for a longitudinal phase shift of the circularly-polarized reflected light with respect to circularly-polarized light incident on the trihedral reflector from the quarter-wave plate.

References Cited

UNITED STATES PATENTS 3,409,375  11/1968  Hubbard _____ 356—106

OTHER REFERENCES

Mauer, P. B.: "Phase Compensation of Total Internal Reflection." JOSA, vol. 56, No. 9, September 1966, pp. 1219–1221.

RONALD L. WIBERT, Primary Examiner

T. MAJOR, Assistant Examiner

U.S. Cl. X.R.

356—106